United States Patent
Zhou et al.

(10) Patent No.: US 10,674,444 B2
(45) Date of Patent: *Jun. 2, 2020

(54) METHOD AND APPARATUS FOR MEASURING INTER-FREQUENCY NEIGHBORING CELL AND USER EQUIPMENT THEREOF

(71) Applicant: Samsung Electronics Co., Ltd., Suwon-si, Gyeonggi-do (KR)

(72) Inventors: Xutao Zhou, Beijing (CN); Chengjun Sun, Beijing (CN); Gert-Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,836

(22) Filed: May 20, 2019

(65) Prior Publication Data

US 2019/0274102 A1    Sep. 5, 2019

Related U.S. Application Data (63) Continuation of application No. 14/400,303, filed as application No. PCT/KR2013/003958 on May 7, 2013, now Pat. No. 10,306,555.

(30) Foreign Application Priority Data

May 9, 2012   (CN) ........................ 2012 1 0141617

(51) Int. Cl.
*H04W 72/00*   (2009.01)
*H04W 52/02*   (2009.01)
(Continued)

(52) U.S. Cl.
CPC ....... *H04W 52/0216* (2013.01); *H04W 24/08* (2013.01); *H04W 24/10* (2013.01);
(Continued)

(58) Field of Classification Search
None
See application file for complete search history.

(56) References Cited

U.S. PATENT DOCUMENTS 10,306,555 B2 *  5/2019  Zhou ...................... H04W 24/08
2010/0208604 A1  8/2010  Kazmi et al.
(Continued)

FOREIGN PATENT DOCUMENTS

KR   10-2010-0034012 A   3/2010
KR   10-2011-0011281 A   2/2011
WO       2011095103 A1   8/2011

OTHER PUBLICATIONS

3GPP TS 36.133 V9.10.0; 3rd Generation Partnership Project; Technical Specification Group Radio Access Network; Evolved Universal Terrestrial Radio Access (E-UTRA); Requirements for support of radio resource management (Release 9); Dec. 2011; 446 pages.

(Continued)

*Primary Examiner* — Khalid W Shaheed (57) ABSTRACT

A method and an apparatus for measuring an inter-frequency neighboring cell is provided. The method comprises obtaining a time requirement of cell identification of a specific carrier, obtaining a time requirement of cell measurement of the specific carrier, identifying a new cell on the corresponding specific carrier in the time requirement of the cell identification of the specific carrier, measuring Reference Signal Receiving Power (RSRP) and/or Reference Signal Receiving Quality (RSRQ) of an identified cell in the time requirement of the cell measurement of the specific carrier, and reporting a measurement result of the identified cell (Continued)

according to a configured measurement event, wherein the specific carrier is different from other carriers, and the time requirement of the cell identification of the specific carrier is different from time requirements of the cell identification of other carriers.

12 Claims, 4 Drawing Sheets

(51) Int. Cl.
*H04W 36/00* (2009.01)
*H04W 24/10* (2009.01)
*H04W 24/08* (2009.01)
*H04W 72/04* (2009.01)
*H04W 48/16* (2009.01)
*H04W 84/04* (2009.01)

(52) U.S. Cl.
CPC ....... *H04W 36/0088* (2013.01); *H04W 52/02* (2013.01); *H04W 72/0446* (2013.01); *H04W 48/16* (2013.01); *H04W 84/045* (2013.01); *Y02D 70/1262* (2018.01); *Y02D 70/24* (2018.01)

(56) References Cited

U.S. PATENT DOCUMENTS

| | | |
|---|---|---|
| 2011/0045858 A1 | 2/2011 | Zheng et al. |
| 2011/0151919 A1 | 6/2011 | Shin |
| 2011/0189987 A1 | 8/2011 | Zhang et al. |
| 2011/0281615 A1 | 11/2011 | Yamada et al. |
| 2012/0094608 A1 | 4/2012 | Shi et al. |
| 2012/0113859 A1 | 5/2012 | Jung et al. |
| 2012/0295610 A1 | 11/2012 | Deng et al. |
| 2014/0092855 A1 | 4/2014 | Ahn et al. |

OTHER PUBLICATIONS

Foreign Communication from Related Counterpart Application; Chinese Patent Application No. 201210141617.6; Second Chinese Office Action dated Jan. 25, 2018; 17 pages.
Supplementary European Search Report dated Feb. 24, 2016 in connection with European Patent Application No. EP 13 78 7980.
Samsung, "FDD Inter-frequency Measurement Requirements When DRX is Used," R4-081926, TSG-RAN WG4 Meeting #48, Aug. 18-22, 2008, 4 pages.
Samsung, "Pico Cell discovery issues," R2-121538, 3GPP TSG-RAN WG2 #77Bis, Mar. 26-30, 2012, 3 pages.
LG Electronics Inc., "Inter-frequency small cell detection," R2-121787, 3GPP TSG-RAN WG2 #77bis, Mar. 26-30, 2012, 3 pages.
NTT Docomo, Inc., "Summary of email discussion [77#31] LTE: Hetnet Mobility: Inter-frequency small cell detection," R2-121487, 3GPP TSG-RAN WG2 #77bis, Mar. 26-30, 2012, 20 pages.
International Search Report dated Aug. 23, 2013 in connection with International Patent Application No. PCT/KR2013/003958, 3 pages.
Written Opinion of the International Searching Authority dated Aug. 23, 2013 in connection with International Patent Application No. PCT/KR2013/003958, 6 pages.

\* cited by examiner

METHOD AND APPARATUS FOR MEASURING INTER-FREQUENCY NEIGHBORING CELL AND USER EQUIPMENT THEREOF

CROSS REFERENCE TO RELATED APPLICATIONS

This application is a continuation of application Ser. No. 14/400,303, which is the National Stage of International Application No. PCT/KR2013/003958, filed May 7, 2013, which claims priority to Chinese Application No. 201210141617.6, filed May 9, 2012, the disclosures of which are fully incorporated herein by reference.

BACKGROUND

1. Field

The present invention relates to radio communication technologies, and more particularly, to a method for measuring an inter-frequency neighboring cell in a hierarchical Heterogeneous Network (HetNet) of inter-frequency deployment and User Equipment (UE).

2. Description of Related Art

With increased demand for mobile communication throughput, it is required that in an area covered by a Marco cell, operators deploy a Pico cell aiming at implementing high throughput according to specific throughput requirements. In order to avoid to intra-frequency interference between cells, the operators may choose to deploy the macro cell and the pico cell on different carriers. In the hierarchical HetNet with the inter-frequency deployment of the macro cell and pico cell, the conventional measurement aiming at seamless switching brings a lot of unnecessary inter-frequency measurements to the UE. In order to improve the conventional inter-frequency measurement aiming at instant switching, the 3GPP sets up a special research project for researching a measurement strategy aiming at load balancing in a hierarchical HetNet of the inter-frequency deployment.

In the moving process of the User Equipment (UE), in order to maintain the continuity of the service, the UE needs to continuously detect and measure the current serving cell and neighboring intra-frequency/inter-frequency cell. The measurement performed by the UE includes: Reference Signal Receiving Power (RSRP) and Reference Signal Receiving Quality (RSRQ).

RSRP represents receiving power of a reference signal and is for measuring the power of a Resource Element (RE) of a cell reference signal.

The RSRQ represents the receiving quality of the cell reference signal. The value of the RSRQ is equal to N*RSRP/(RSSI). N is a number of resource blocks. RSSI is a strength indicator of a received signal and includes power of a serving cell, a non-serving cell and a thermal noise.

In order to measure the inter-frequency cell, the UE needs to adjust working frequency of a receiver according to an inter-frequency frequency point. In order to guarantee that the service of the current serving cell is not interrupted, the serving cell will configure a measurement gap with a period of 40 ms or 80 ms and with a length of 6 ms for inter-frequency measurement. The UE identify and measure the inter-frequency cell in the configured measurement gap. As for the measurement aiming at the mobile switching, in order to guarantee the balance between the frequency points, the UE measures the inter-frequency frequency points configured by the eNBs adopting a mechanism of sequential measurement.

The measurement of the inter-frequency cell performed by the UE includes two steps, i.e. cell identification and cell measurement. As for a new cell, the UE performs synchronization of carrier frequency adopting information of the frequency point notified by the current serving cell, performs timing synchronization adopting primary synchronization and secondary synchronization signals, and determines a physical layer identifier of a cell. As for an identified cell, i.e. the cell, on which time and frequency synchronization is performed and the physical layer identifier of which is determined, the receiving power and receiving quality is measured according to the reference symbol, and the report is made according to a measurement event configured by the eNB.

A current LTE network eNB may configure the UE for measuring the serving cell and the neighboring cell and reporting a measurement message, to control the mobility of the UE. In order to limit the number of signalings sent to the eNB, a measurement and reporting event may trigger the measurement and reporting through the eNB configuration. The LTE single carrier system defines following event triggering and reporting standards:

Event A1: measurement result of the serving cell is better than an absolute threshold;

Event A2: the measurement result of the serving cell is worse than the absolute threshold;

Event A3: the measurement resulting of the neighboring cell is better than an offset of the serving cell; and Event A4: the measurement result of the neighboring cell is better than the absolute threshold.

When one or multiple cells satisfy a designated entering condition, the UE triggers an event. The eNB may set configurable parameters used in these conditions to affect the entering condition. In order to trigger the event, the entering condition at least satisfies the conditions in the time to trigger configured by the network.

The current LTE network eNB may configure the UE according to the service condition of the UE to let the UE perform a Discontinuous Reception (DRX) scheme, so that the UE may discontinuously monitor a Physical Downlink Control Channel (PDCCH) the serving cell. At the same time, the UE may choose not to measure the serving cell or the neighboring cell in a configured sleeping stage of the configured DRX, while the associated measurements in a DRX On-Duration is performed, to save the UE measurement power consumption.

As for a performance index of the cell identification and cell measurement, a related 3GPP standard respectively defines the minimum requirements of the maximum time requirements of the cell identification and cell measurement. That is, the UE needs to finish the measurement and reporting of the cells satisfying the above conditions within the maximum time requirement. The minimum requirement is defined in the related 3GPP standard according to cell identification ability of the UE. The time requirement is a fixed time length if the DRX is not configured. If the DRX is configured, the time requirement is an integer multiple of a DRX cycle.

In a hierarchical HetNet of the inter-frequency deployment, the target for deploying the carrier of the pico cell is to balance the load of the macro cell, to enhance the throughput of the system. The measurement of the carrier aiming at the load balance has characteristics related to the UE service. That is, as for the UE with relatively low requirements on the throughput, the operation of quickly and timely switching the UE to the pico cell not only cannot improve the whole performance of the system, but also increases the UE measurement power consumption. In addition, as for an area, in which the pico cells are deployed with a low density, if a UE with a low moving speed frequently identifies the cells on the pico cell carrier, the UE measurement power consumption is inevitably enhanced. At the same time, from the point of view of the system performance, the existing measurement accuracy and switching performance cannot be enhanced. Therefore, the identification and measurement of the cell on the specific carrier needs to be improved, to guarantee the balance between the UE measurement power consumption and the system performance.

SUMMARY

Aspects of the present invention are to address the above-mentioned problems and/or disadvantages and to provide at least the advantages below. Accordingly, the present invention provides a method and an apparatus for measuring an inter-frequency neighboring cell, to reduce the measurement frequency of the inter-frequency neighboring cell performed by the UE and the power consumption of the UE in the hierarchical HetNet.

In accordance with an aspect of the present invention, a method for measuring an inter-frequency neighboring cell by a User Equipment (UE) is provided, the method comprises obtaining a time requirement of cell identification of a specific carrier, obtaining a time requirement of cell measurement of the specific carrier, identifying a new cell on the corresponding specific carrier in the time requirement of the cell identification of the specific carrier, measuring Reference Signal Receiving Power (RSRP) and/or Reference Signal Receiving Quality (RSRQ) of an identified cell in the time requirement of the cell measurement of the specific carrier, and reporting a measurement result of the identified cell according to a configured measurement event, wherein the specific carrier is different from other carriers, and the time requirement of the cell identification of the specific carrier is different from time requirements of the cell identification of other carriers.

In accordance with another aspect of the present invention, a UE for measuring an inter-frequency neighboring cell is provided, the UE comprises a controlling module for obtaining a time requirement of cell identification and a time requirement of cell measurement of a specific carrier, select a measurement chance in the time requirement of the cell identification and the time requirement of the cell measurement according to identification ability of the UE, a receiving module for performing the cell identification and cell measurement on the specific carrier according to the measurement chance selected by the controlling module, and a sending module for sending a measurement report according a configured measurement event to report a measurement result.

Preferably, a time length of the time requirement of the cell identification of the specific carrier is longer than the minimum requirement of a time requirement of the cell identification of a non-specific carrier.

Preferably, the time requirement of the cell identification of the specific carrier is a specific time length configured by an eNB via a signaling, or a pre-defined time length.

Preferably, the pre-defined time length is a specific time length if Discontinuous Reception (DRX) is not configured, and the pre-defined time length is an integer multiple of a DRX period if the DRX is configured.

Preferably, a time length of the time requirement of the cell measurement of the specific carrier is longer than or equal to the minimum of the time requirement of the cell measurement of a non-specific carrier.

Preferably, the time requirement of the cell measurement of the specific carrier is a time length configured by an eNB via a signaling, or a pre-defined time length.

Preferably, the pre-defined time length is a specific time length if DRX is not configured, and the pre-defined time length is an integer multiple of a DRX period if the DRX is configured.

Preferably, the UE determines, according to a Boolean variable configured by an eNB via a signaling, whether to identify a new cell in a time scope of the time requirement of the cell identification of the obtained specific carrier or in a time scope of the minimum requirement of the time requirement of the cell identification of the non-specific carrier.

Preferably, the UE determines a time length T' needed for finishing the cell identification of an inter-frequency new cell according to its cell identification ability, and starts to identify the new cell in the last T' of the time requirement of the cell identification; or Preferably, the UE determines the time length T' needed for finishing the cell identification of the inter-frequency new cell according to its cell identification ability, identifies the new cell according to the time requirement of the cell identification and a measurement interval of T', wherein the measurement interval is longer than the measurement interval of the non-specific carrier.

Preferably, the UE determines, according to a Boolean variable configured by an eNB via a signaling, whether to perform the measurement in a time scope of the time requirement of the cell measurement of the obtained specific carrier or in a time scope of the minimum requirement of the time requirements of the cell measurement of the other carriers.

It can be seen from the above technical scheme that the technical scheme provided by the present invention improves the strategy that the existing UE sequentially measures each carrier in a connection state. As for the carrier, at which the cell locates deployed for the target of load balance, the time requirement of the cell identification of this kind of carrier of the UE is extended through setting certain time requirements of the cell identification and cell measurement, by which the unnecessary inter-frequency measurement is greatly reduced, the frequency of the inter-frequency neighboring cell measurement performed by the UE is effectively reduced, and the measurement power consumption of the UE is reduced. At the same time, as for the identified cell, the cell is measured according the existing or extended measurement time requirement, by which the accuracy requirements of the measurement and the accuracy of the switching are guaranteed.

DETAILED DESCRIPTION

The present invention is further described in detail hereinafter with reference to the accompanying drawings to make the objective, technical solution and merits thereof more apparent.

Figure 1:
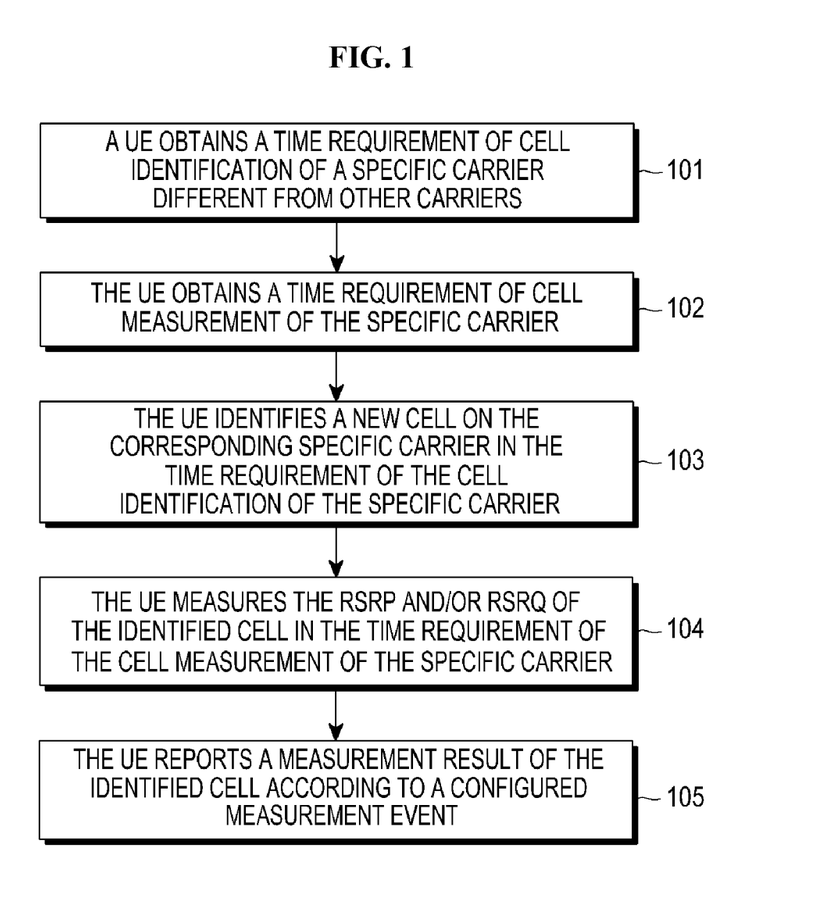
FIG. 1 is a flow chart illustrating a method for measuring an inter-frequency neighboring cell in accordance with an embodiment of the present invention.

In order to solve the problem in the existing technology, the present invention provides a method for measuring an inter-frequency cell. As shown in FIG. 1 the method includes the following steps.

FIG. 1 is a flow chart illustrating a method for measuring an inter-frequency neighboring cell in accordance with an embodiment of the present invention.

Referring to the FIG. 1, in a step 101: a UE obtains a time requirement of cell identification on a specific carrier. The time requirement is different from other time requirements of the cell identification on other carriers.

In a step 102: the UE obtains a time requirement of cell measurement on a specific carrier.

In a step 103: the UE identifies a new cell on a corresponding specific carrier in the time requirement of the cell identification on the specific carrier.

In a step 104: the UE measures the RSRP and/or RSRQ of the identified cell in the time requirement of the cell measurement on the specific carrier.

In a step 105: the UE reports a measurement result of the identified cell according to a configured measurement event.

In a step 101, the specific carrier obtained by the UE may be a carrier designated by an eNB according to its deployment and aiming at load balance, or a carrier, in which the eNB wishes to extend the time requirement of the cell identification and the cell measurement. For instance, the specific carrier may be the carrier used in a Pico cell or a Femto cell.

In a step 101, there are two preferred methods for the UE to obtain the time requirement of the cell identification of the specific carrier.

The first preferred method is:

receiving a signaling indicating configuring the time requirement of the cell identification of the carrier with the specific type sent from the eNB. The signaling includes a specific time length. The time requirement of the cell identification of the specific carrier is the specific time length configured by the eNB through the signaling. For instance, the eNB configures the time length of the cell identification of the specific carrier with the specific type as 1 minute via sending the signaling. Therefore, on the specific carrier, the time requirement of the cell identification is 1 minute.

The second preferred method includes:

pre-defining the time requirement of the cell identification of the carrier with the specific type. For instance, the time requirement of the cell identification of the carrier with the specific type may be defined in the related 3GPP standard.

The UE receives an indication sent from the eNB indicating adopting the time requirement of the cell identification of the carrier with the specific type and uses the time requirement of the cell identification defined in the related 3GPP standard according to the indication. For instance, the related 3GPP standard pre-defines the time length requirement of the cell identification of the pico cell. The UE receives the carrier type of the specific carrier sent from the eNB via the signaling. If the carrier is the one used in the pico cell, the UE applies the time requirement of the cell identification of the pico cell defined in the related 3GPP standard to the carrier of the pico cell according to the indication of the eNB.

If the conventional method is adopted to pre-define the time requirement of the cell identification of the carrier with the specific type in the related 3GPP standard and the DRX is configured, the time length should be an integer multiple of the DRX cycle. As shown in table 1:

TABLE 1

| | Time length of the cell identification | |
|---|---|---|
| Length of DRX period (s) | Measurement gap period is 40 ms | Measurement gap period is 80 ms |
| ≤0.16 | Use the time length without the DRX configured | Use the time length without the DRX configured |
| 0.256 | 200 DRX periods time the number of designated and measured inter-frequency frequency points | 300 DRX periods time the number of designated and measured inter-frequency frequency points |
| 0.32 | 200 DRX periods time the number of designated and measured inter-frequency frequency points | 240 DRX periods time the number of designated and measured inter-frequency frequency points |
| 0.32 < DRX period ≤ 2.56 | 200 DRX periods time the number of designated and measured inter-frequency frequency points | 200 DRX periods time the number of designated and measured inter-frequency frequency points |

In table 1, taking the integer multiple (i.e., 200, 240 and 300) of the DRX period for example, other specific values are also in the protection scope of the present invention.

If the DRX is not configured, the time length defined in the related 3GPP standard should be the specific time, for instance 1 minute.

Compared with the minimum requirement of the time requirement of the cell identification defined on the basis of the UE identification ability in the existing standard, the time requirement obtained by the UE in a step 101 is larger than the minimum requirement, so that the UE may have more chances to reduce the measurement power consumption.

The minimum requirement of the time requirement of the cell identification defined on the basis of the UE identification ability in the related 3GPP standard refers to the requirement for identifying an inter-frequency cell defined in the related 3GPP standard. Taking the situation that the inter-frequency FDD is configured with the DRX for example, as shown in table 2:

TABLE 2

| | $T_{identify\_inter}$ (s) (DRX period) | |
|---|---|---|
| Length of DRX period (s) | Measurement gap period is 40 ms | Measurement gap period is 80 ms |
| ≤0.16 | Use the time length without the DRX configured, such as chapter 8.1.2.3.1.1 | Use the time length without the DRX configured, such as chapter 812.311 |
| 0.256 | 5.12*$N_{freq}$ (20*$N_{freq}$) | 7.68*$N_{freq}$ (30*$N_{freq}$) |

TABLE 2-continued

| | $T_{identify\_inter}$ (s) (DRX period) | |
|---|---|---|
| Length of DRX period (s) | Measurement gap period is 40 ms | Measurement gap period is 80 ms |
| 0.32 | 6.4*$N_{freq}$ (20*$N_{freq}$) | 7.68*$N_{freq}$ (24*$N_{freq}$) |
| 0.32 < DRX period ≤ 2.56 | Remark (20*$N_{freq}$) | Remark (20*$N_{freq}$) |

Remark: the time depends on the used DRX period

In the above table 2, Tidentify_inter is the time length of the cell identification.

Nfreq is the number of the inter-frequency frequency points needed to be measured to ensure the measurement requirement design principle that the UE sequentially measures all the frequency points.

According to the above table 2, when the configured DRX period is 0.32 s, the minimum requirement of the time requirement of the cell identification of the related 3GPP standard requires that the UE finishes the measurement of a new FDD inter-frequency cell in 20 DRX periods in the situation that the period of the measurement gap is configured with 40 ms.

If the DRX is not configured, the minimum requirement of the time requirement of the cell identification pre-defined in the related 3GPP standard is the specific time length, as shown in the following equation (1):

$$T_{Identify\_Inter} = T_{Basic\_Identify\_Inter} \cdot \frac{480}{T_{Inter1}} \cdot N_{freq} \text{ ms} \quad (1)$$

TInter1 is 60 ms if the period of the measurement gap is 40 ms. TBasic_Identify_Inter is 480 ms. Therefore, if the DRX is not configured, the specific time length is 3.84 s multiplied by Nfreq. Nfreq is the number of the inter-frequency frequency points needed to be measured to ensure the strategy that the UE sequentially measures all the frequency points.

In the step 102, there are two preferred methods for the UE to obtain the time requirement of the cell measurement on the specific carrier.

The first preferred method includes:

receiving a signaling indicating configuring the time requirement of the cell identification of the carrier with the specific type sent from the eNB. For instance, the time length of the cell measurement of the carrier with the specific type is configured as 800 ms. Therefore, on the specific carrier, the time requirement of the cell measurement is 800 ms.

The second preferred method includes:

pre-defining the time requirement of the cell measurement on the carrier with the specific type in the related 3GPP standard. For instance, the time requirement of the cell measurement of the carrier with the specific type may be defined in the related 3GPP standard.

The UE receives an indication sent from the eNB indicating adopting the time requirement of the cell measurement of the carrier with the specific type, and the UE uses the time requirement of the cell measurement defined in the related 3GPP standard according to the indication. For instance, the standard pre-defines the time requirement of the cell measurement of the pico cell. The UE receives the carrier type of the specific carrier sent from the eNB via the signaling. For instance, the carrier is the one used in the pico cell. The UE applies the time requirement of the cell measurement of the pico cell defined in the related 3GPP standard to the carrier of the pico cell according to the indication of the eNB.

If the time requirement of the cell measurement of the carrier with the specific type is pre-defined in the standard with this implementation method and the DRX is configured, the time length should be an integer multiple of the DRX cycle. As shown in table 3:

TABLE 3

| Length of DRX period | Time requirement of the cell measurement |
|---|---|
| ≤0.08 | Use the time length without the DRX configured |
| 0.08 < DRX period ≤ 2.56 | 50 DRX periods time the number of inter-frequency frequency points needed to be measured |

In table 3, taking the integer multiple (i.e., 50) of the DRX period for example, other specific values are also in the protection scope of the present invention.

If the DRX is not configured, the time length defined in the standard should be the specific time, for instance 5 s.

Compared with the minimum requirement of the time requirement of the cell measurement defined on the basis of the measurement ability of the UE in the related 3GPP standard, the time requirement obtained by the UE in the step 102 is larger than or equal to the minimum requirement. If the time requirement is equal to the minimum requirement, it means that the UE directly takes the existing minimum requirement of the time requirement of the cell measurement performed by the UE as the time length requirement of the cell measurement.

The minimum requirement of the time requirement of the cell measurement defined on the basis of the measurement ability of the UE in the related 3GPP standard refers to the time requirement for measuring an inter-frequency cell defined in the related 3GPP standard. Taking the situation that the inter-frequency FDD is configured with the DRX for example, as shown in table 4:

TABLE 4

| Length of DRX period (s) | $T_{measure\_inter}$ (s) (DRX period) |
|---|---|
| ≤0.08 | Use the time length without the DRX configured |
| 0.08 < DRX period ≤ 2.56 | Remark (5*$N_{freq}$) |

Remark: the time depends on the used DRX period

In the above table 4, Tmeasure_inter is the time length of the cell measurement.

Nfreq is the number of the inter-frequency frequency points needed to be measured, to ensure the strategy that the UE sequentially measures all the frequency points.

According to the above table 4, when the configured DRX period is larger than 0.08 s, the minimum requirement of the time requirement of the cell measurement of the related 3GPP standard requires that the UE finishes the measurement of a new FDD inter-frequency cell in 20 DRX periods.

If the minimum requirement of the time requirement of the cell measurement pre-defined by the above standard is not configured with the DRX, the minimum requirement is the specific time length, as shown in table 5:

TABLE 5

| Configuration | Physical layer measurement period: $T_{Measurement\ Period\ Inter\ FDD}$ [ms] | Measurement bandwidth [RB] |
|---|---|---|
| 0 | 480 × $N_{freq}$ | 6 |
| 1 (Note) | 240 × $N_{freq}$ | 50 |

Remark: the configuration is optional

According to table 5, if the measurement gap is configuration 0, the physical layer measurement period is equal to 480 ms multiplied by Nfreq. Nfreq is the number of the inter-frequency frequency points needed to be measured, to ensure the strategy that the UE sequentially measures all the frequency points.

The execution sequence of the above steps 101 and 102 is not limited.

In the above steps 101 and 102, when the UE obtains the time requirements of the cell identification and cell measurement with the second implementation method, i.e. pre-defining the time requirements of the cell identification and cell measurement of a carrier with the specific type in the related 3GPP standard, the UE may apply the time requirement of the cell identification or the time requirement of the cell measurement according to the related signaling indication obtained from the eNB, or obtain the signaling indicating the carrier type from the eNB, and selects the carrier with the specific type which should use the pre-defined time requirement according to the signaling, so that the time requirement of the cell identification and the time requirement of the cell measurement are indicated by the same signaling.

In the above step 103 may include the following implementation method:

When the UE obtains the time requirement of the cell identification of the specific carrier using the first preferred implementation method, i.e., the UE receives the signaling indicating configuring the time requirement of the cell identification of the carrier with the specific type sent from the eNB, the UE identifies and detects the new cell in the scope of the time requirement of the cell identification indicated by the signaling on the obtained specific carrier.

When the UE obtains the time requirement of the cell identification of the specific carrier using the second preferred implementation method, i.e., pre-defines the time requirement of the cell identification of the carrier with the specific type in the related 3GPP standard, the UE identifies and detects the new cell in the scope of the time requirement of the cell identification pre-defined in the related 3GPP standard on the obtained specific carrier.

In the above step 103, the UE may determine whether to use the obtained time requirement as the time requirement of the cell identification according to a Boolean parameter configured by the following signaling.

When the above Boolean parameter is true, the UE selects, on the obtained carrier, a suitable measurement gap or DRX on-duration according to the obtained and extended time requirement of the cell identification and the cell identification ability of the UE, to identify and detect the new cell.

When the above Boolean parameter is false, the UE selects, on the obtained carrier, the suitable measurement gap or DRX on-duration according to the minimum requirement of the cell identification ability of the UE configured in the related 3GPP standard, to identify and detect the new cell.

The cell identification ability of the UE refers the number of the measurement gaps or DRX on-durations needed by the UE for finishing the cell identification satisfying the identification requirement once, i.e. finishing the time and frequency synchronization of the new cell and the determination of the physical layer cell identifier, according to a cell identification algorithm configured by the UE. Generally, the UE may take the above minimum requirement defined in the related 3GPP standard as the reference of its cell identification ability.

In the above step 103, there are two preferred methods for selecting the suitable measurement gap or the DRX on-duration.

The first preferred implementation method includes only finishing the cell identification of the new cell in the final stage of the configured time requirement.

For instance, suppose that the cell identification ability of the UE is 3.84 s and the configured time requirement of the cell identification is 1 minute, the final stage of the configured time requirement is the last 3.84 s of the 1 minute. That is, the cell identification detection is continuously performed on the cell of the configured frequency point at the last 3.84 s of the 1 minute. The cell identification detection needs not to be performed in the foregoing measurement gap or DRX on-duration, by which a great deal of measurement power consumption caused by the cell identification is saved.

The second preferred implementation method includes selecting a longer measurement gap for finishing the cell identification of the new cell.

For instance, suppose that the cell identification ability of the UE is 20 DRX periods and the configured time requirement of the cell identification is 200 DRX periods, in the 200 DRX periods, the cell identification detection is performed on the cell of the configured frequency point within on-duration every 10 DRX. While in other on-durations within 10 DRX, unnecessary cell identification detection is not performed, so that a great deal of power consumption caused by the cell identification is saved.

In the above step 104, the time requirement defined according to the measurement ability of the UE in the related 3GPP standard may be taken as the time requirement of the cell measurement, as shown in table 6:

TABLE 6

| Length of DRX period | Time requirement of the cell measurement |
|---|---|
| ≤0.08 | Use the time length without the DRX configured |
| 0.08 < DRX period ≤ 2.56 | 5 DRX periods time the number of inter-frequency frequency points needed to be measured |

The present invention is further described in detail hereinafter with reference to the accompanying drawings to make the objective, technical solution and merits thereof more apparent.

Embodiment One

Figure 2:
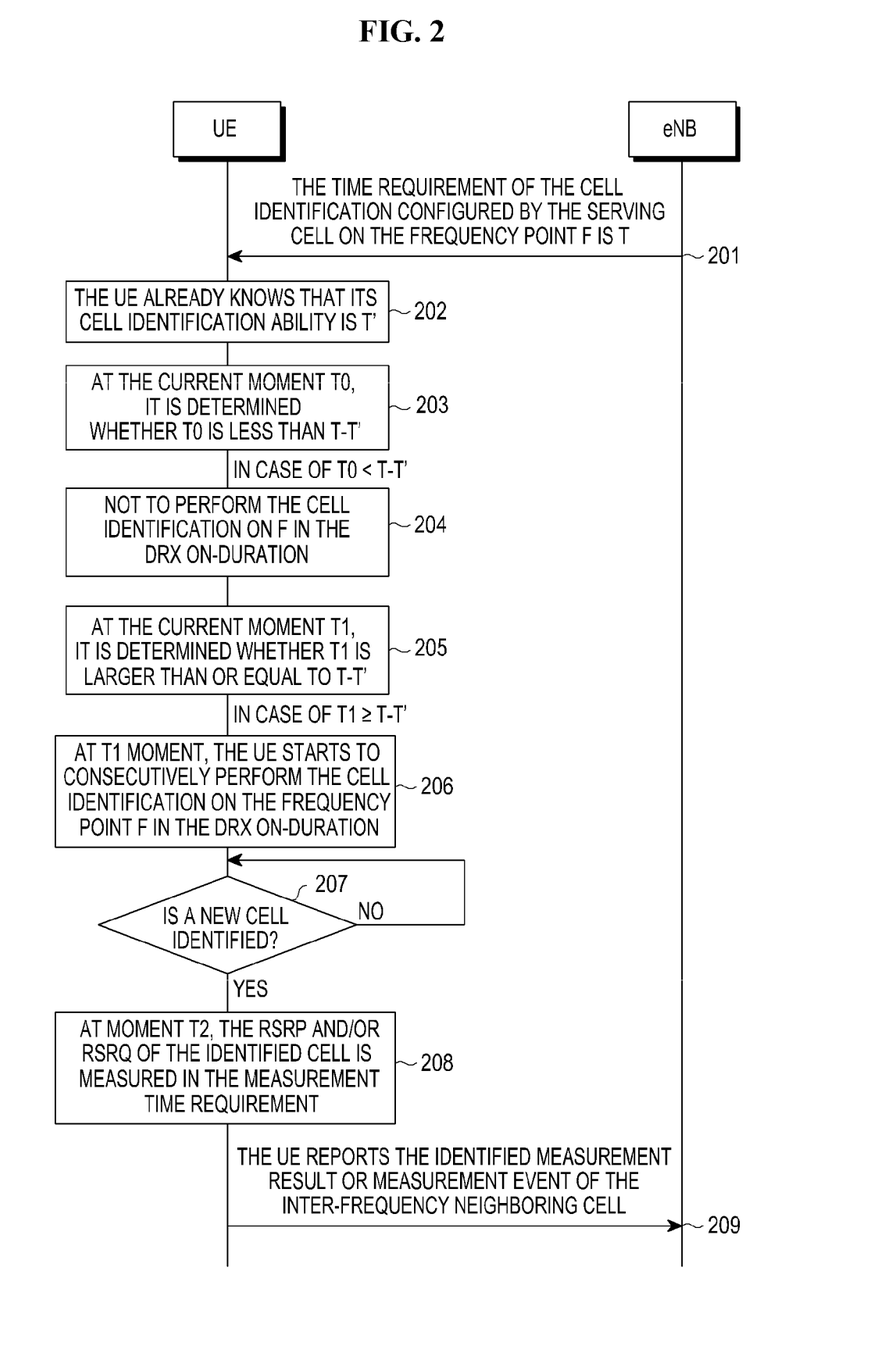
FIG. 2 is a chart illustrating implementation flow of embodiment one of the present invention.

This embodiment describes that the time requirement of the cell identification configured by the eNB is the specific time length. After obtaining the time requirement of the cell identification, the UE performs the cell identification using the last DRX on-duration in the time requirement on the designated carrier.

FIG. 2 is a chart illustrating implementation flow of embodiment one of the present invention. The flow includes the following steps.

Referring to the FIG. 2, in a step 201: an eNB sends a time requirement of cell identification of a designated frequency point F to a UE via a broadcast message or a Radio Resource Configuration Message, indicating the UE to finish the identification of the new cell on the frequency point F in the time length T. If the DRX is configured, T is an integer multiple of the DRX period.

In a step 202: the UE marks its cell identification ability as T'. That is, the UE may finish the identification of an inter-frequency new cell in T'. If the DRX is configured, T is an integer multiple of the DRX period.

In a step 203: at the current moment T0, it is determined whether T0 is less than T-T'. That is, it is determined whether the current moment is in the last T' period of the designated time requirement T. Suppose that T0 is not in the last T' period of the designated time requirement T, a step 204 continues to be executed.

In a step 204: when the current moment is not in the last T' period of the designated time requirement T, the UE does not perform the cell identification detection of the frequency point F in the DRX on-duration.

In a step 205: at the current moment T1, it is determined whether T1 is larger than or equal to T-T'. That is, it is determined whether the current moment is in the last T' period of the designated time requirement T. Suppose that T1 is in the last T' period of the designated time requirement T, a step 206 continues to be executed.

In a step 206: when the current moment is in the last T' period of the designated time requirement T, the UE continuously performs the cell identification detection of the frequency F in the DRX on-duration.

In a step 207: the UE determines whether a new cell is detected according to a cell identification detection algorithm. If yes, a step 208 continues to be performed.

In the step 208: at the moment T2, the UE measures and identifies the RSRP and/or RSRQ of the cell in the measurement time requirement. If there is no time requirement of the cell measurement configured by the signaling, the UE takes the minimum requirement of the time requirement of the cell measurement defined in the related 3GPP standard as the measurement time scope for finishing the cell measurement.

In a step 209: the UE reports a measurement value or measurement event of the identified inter-frequency cell according to a configured measurement requirement.

Embodiment Two

Figure 3:
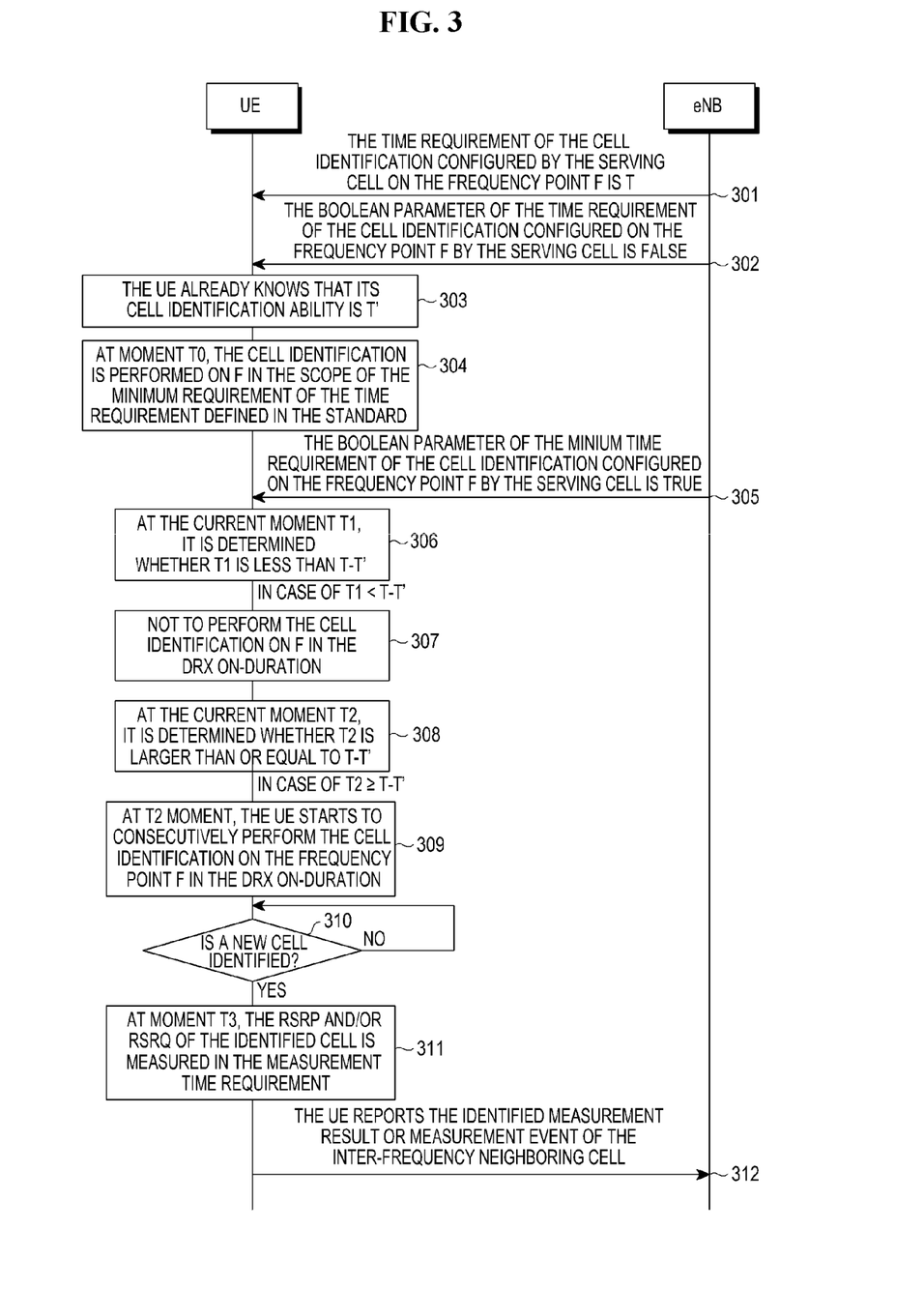
FIG. 3 is a chart illustrating implementation flow of embodiment two of the present invention.

This embodiment describes that the eNB configures an extended time requirement of the cell identification. The UE determines whether to take the obtained and extended time requirement as the time requirement of the cell identification, or take the minimum requirement of the time requirement of the cell identification defined in the related 3GPP standard as the time requirement of the cell identification according to the configured Boolean parameter.

FIG. 3 is a chart illustrating implementation flow of embodiment two of the present invention. The flow includes the following steps.

Referring to the FIG. 3, in a step 301: an eNB sends a time requirement of cell identification of a designated carrier frequency F to a UE via a broadcast message or a Radio Resource Configuration Message, indicating the UE to finish the identification of the new cell of the frequency F in the time length T. In the situation that DRX is configured, T is an integer multiple of the DRX period.

In a step 302: the Boolean parameter of applying the minimum time requirement of the cell identification configured on the frequency point F by the eNB of the serving cell is false.

In a step 303: the UE marks its cell identification ability as T'. That is, the UE may finish the identification of an inter-frequency new cell in T' once. If DRX is configured, T' is an integer multiple of the DRX period.

In a step 304: at the moment T0, the UE starts the cell identification detection in the scope of the minimum requirement of the time requirement defined in the related 3GPP standard at the frequency point F.

In a step 305: the Boolean parameter of applying the minimum time requirement of the cell identification configured on the frequency point F by the eNB of the serving cell is true.

In a step 306: at the current moment T1, it is determined whether T1 is less than T-T'. That is, it is determined whether the current moment is in the last T' period of the designated time requirement T. Suppose that T1 is not in the last T' period of the designated time requirement T, a step 307 continues to be executed.

In the step 307: when the current moment is in the last T' period of the designated time requirement T, the UE does not perform the cell identification detection of the frequency F in the DRX on-duration.

In a step 308: at the current moment T2, it is determined whether T2 is larger than or equal to T-T'. That is, it is determined whether the current moment is in the last T' period of the designated time requirement T. Suppose that T2 is in the last T' period of the designated time requirement T, a step 309 continues to be executed.

In the step 309: when the current moment is in the last T' period of the designated time requirement T, the UE continuously performs the cell identification detection of the frequency point F in the DRX on-duration.

In a step 310: the UE determines whether a new cell is detected according to the cell identification detection algorithm. If yes, a step 311 continues to be executed.

In the step 311: at T3 moment, the UE measures and identifies the RSRP and/or RSRQ of the cell in the scope of the minimum requirement of the measurement time requirement defined in the related 3GPP standard. If there is no time requirement of the cell measurement configured by the signaling, the UE takes the minimum requirement of the time requirement of the cell measurement defined in the related 3GPP standard as the measurement time scope for finishing the cell measurement.

In a step 312: the UE reports a measurement value or measurement event of the identified inter-frequency neighboring cell according to a configured measurement requirement.

Embodiment Three

Figure 4:
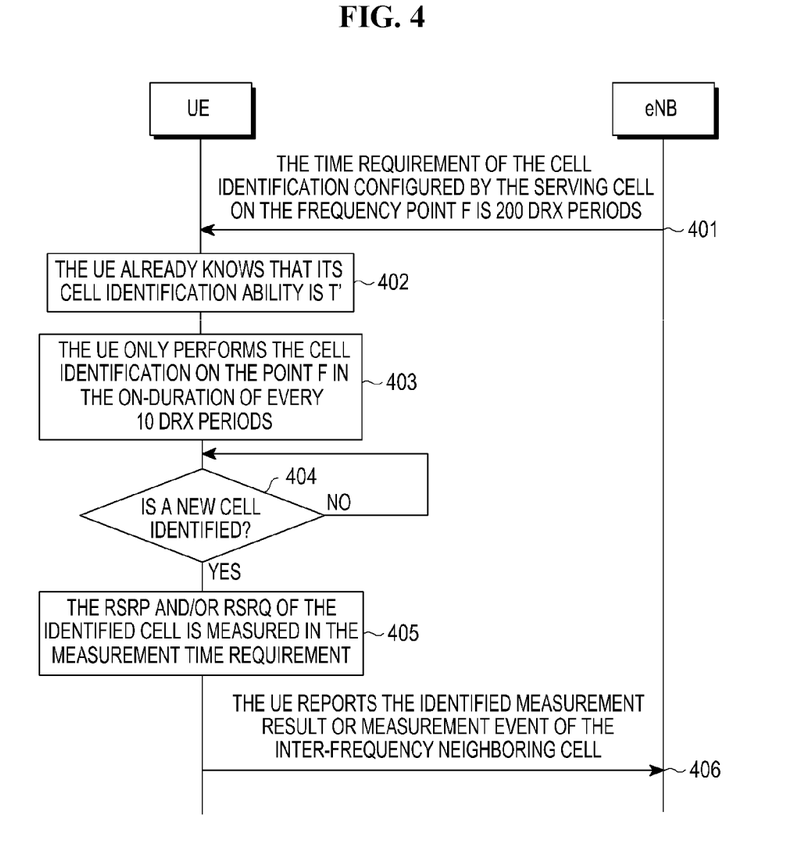
FIG. 4 is a chart illustrating implementation flow of embodiment three of the present invention.

This embodiment describes that the time requirement of the cell identification configured by the eNB is the specific time length. After obtaining the time requirement of the cell identification, the UE applies the time requirement to the designated carrier, and performs the cell identification using the DRX on-duration with longer interval.

FIG. 4 is a charting illustrating implementation flow of embodiment three of the present invention. The flow includes the following steps.

Referring to the FIG. 4, in a step 401: an eNB sends a time requirement of cell identification of a designated frequency point F to a UE via a broadcast message or a Radio Resource Configuration Message, indicating the UE to finish the identification of a new cell of the frequency point F in the time length of 200 DRX periods.

In a step 402: the UE already knows that its cell identification ability is 20 DRX periods. That is, the UE may finish the identification of the inter-frequency new cell in the 20 DRX periods.

In a step 403: the UE performs the identification detection of the new cell of the frequency point F in the on-duration of every 10 DRX periods. That is, in the time scope of the 200 DRX, the UE obtains the detection time of the 20 DRX periods, to finish the identification detection of the new cell.

In a step 404: the UE determines whether the new cell is detected according to the cell identification detection algorithm. If yes, a step 405 continues to be executed.

In the step 405: the UE measures and identifies the RSRP and/or RSRQ of the cell in the measurement time requirement. If there is no time requirement of the cell measurement configured by the signaling, the UE takes the minimum requirement of the time requirement of the cell measurement defined in the related 3GPP standard as the measurement time scope for finishing the cell measurement.

In a step 406: the UE reports a measurement value or measurement event of the identified inter-frequency neighboring cell according to a configured measurement requirement.

Figure 5:
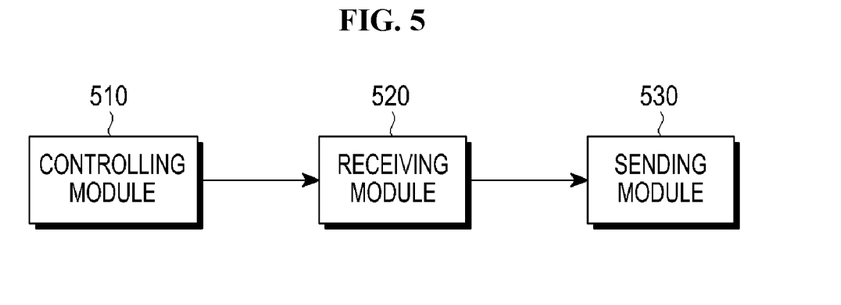
FIG. 5 is a schematic diagram illustrating structure of a UE in accordance with a preferred embodiment of the present invention.

Corresponding to the above method, as shown in FIG. 5, the present invention further provides a UE.

FIG. 5 is a schematic diagram illustrating structure of a UE in accordance with a preferred embodiment of the present invention.

As shown in FIG. 5, the UE includes a controlling module 510, a receiving module 520 and a sending module 530.

The controlling module 510 is to obtain a time requirement of cell identification and a time requirement of cell measurement of a specific carrier, and select a measurement chance in the time requirement of the cell identification and the time requirement of the cell measurement according to identification ability of the UE.

The receiving module 520 is to perform the cell identification and cell measurement on the specific carrier according to the measurement chance selected by the controlling module 520.

The sending module 530 is to send a measurement report according to a configured measurement event, to report a measurement result.

Specifically speaking, the controlling module 530 selects the suitable measurement chance in the time requirements of the cell identification and cell measurement according to the time requirements of the cell identification and cell measurement configured by the eNB or pre-defined in the related 3GPP standard and the identification ability of the UE and notifies the receiving module 520. The receiving module 520 receives the synchronization symbol and reference symbol of the eNB on the specific carrier according to the measurement chance selected by the controlling module 510 to perform the cell identification and cell measurement.

The foregoing only describes preferred examples of the present invention and is not used to limit the protection scope of the present invention. Any modification, equivalent substitution and improvement without departing from the spirit and principle of the present invention are within the protection scope of the present invention.

What is claimed is:

1. A method for measuring an inter-frequency neighboring cell by an electronic device, the method comprising:

identifying a time requirement of a cell identification of a first carrier, wherein the time requirement of the cell identification of a carrier indicates a time length within which the electronic device performs identification of any cell on the carrier;

identifying a time requirement of a cell measurement of the first carrier;

identifying a cell on the first carrier based on the time requirement of the cell identification of the first carrier;

performing measurement on the identified cell based on the time requirement of the cell measurement of the first carrier; and reporting a result of the measurement on the identified cell, wherein the time requirement of the cell measurement of the first carrier related to a first frequency range is different from the time requirement of the cell measurement of a second carrier related to a second frequency range, and wherein the time requirement of the cell identification of the first carrier related to the first frequency range is different from the time requirement of the cell identification of the second carrier related to the second frequency range.

2. The method of claim 1, wherein a time length of the time requirement of the cell identification of the first carrier is configured by a base station via a signaling.

3. The method of claim 1, wherein a time length of the time requirement of the cell identification of the first carrier is based on a period of Discontinuous Reception (DRX), if the DRX is configured.

4. The method of claim 1, wherein the result of the measurement on the identified cell includes at least one of Reference Signal Receiving Power (RSRP) and Reference Signal Receiving Quality (RSRQ) of the identified cell.

5. The method of claim 1, wherein a time length of the time requirement of the cell measurement of the first carrier is configured by a base station via a signaling.

6. The method of claim 1, wherein a time length of the time requirement of the cell measurement of the first carrier is based on a period of Discontinuous Reception (DRX), if the DRX is configured.

7. An electronic device for measuring an inter-frequency neighboring cell, the electronic device comprising:

a transceiver; and a controller coupled to the transceiver, wherein the controller is configured to:

identify a time requirement of a cell identification of a first carrier, wherein the time requirement of the cell identification of a carrier indicates a time length within which the electronic device performs identification of any cell on the carrier;

identify a time requirement of a cell measurement of the first carrier;

identify a cell on the first carrier based on the time requirement of the cell identification of the first carrier;

perform measurement on the identified cell based on the time requirement of the cell measurement of the first carrier; and report a result of the measurement on the identified cell, wherein the time requirement of the cell measurement of the first carrier related to a first frequency range is different from the time requirement of the cell measurement of a second carrier related to a second frequency range, and wherein the time requirement of the cell identification of the first carrier related to the first frequency range is different from the time requirement of the cell identification of the second carrier related to the second frequency range.

8. The electronic device of claim 7, wherein a time length of the time requirement of the cell identification of the first carrier is configured by a base station via a signaling.

9. The electronic device of claim 7, wherein a time length of the time requirement of the cell identification of the first carrier is based on a period of Discontinuous Reception (DRX), if the DRX is configured.

10. The electronic device of claim 7, wherein the result of the measurement on the identified cell includes at least one of Reference Signal Receiving Power (RSRP) and Reference Signal Receiving Quality (RSRQ) of the identified cell.

11. The electronic device of claim 7, wherein a time length of the time requirement of the cell measurement of the first carrier is configured by a base station via a signaling.

12. The electronic device of claim 7, wherein a time length of the time requirement of the cell measurement of the first carrier is based on a period of Discontinuous Reception (DRX), if the DRX is configured.

* * * * *